US 6,553,495 B1

(12) United States Patent
Johansson et al.

(10) Patent No.: US 6,553,495 B1
(45) Date of Patent: Apr. 22, 2003

(54) ANTI-THEFT DEVICE

(75) Inventors: Christer Johansson, Alingsås (SE); Bengt Törngren, Sollebrunn (SE)

(73) Assignee: Impsys AB, Alingås (SE)

( * ) Notice: Subject to any disclaimer, the term of this patent is extended or adjusted under 35 U.S.C. 154(b) by 0 days.

(21) Appl. No.: 09/194,588

(22) PCT Filed: May 29, 1997

(86) PCT No.: PCT/SE97/00923

§ 371 (c)(1),
(2), (4) Date: Dec. 29, 1998

(87) PCT Pub. No.: WO97/45780

PCT Pub. Date: Dec. 4, 1997

(30) Foreign Application Priority Data

May 31, 1996 (SE) .............................................. 9602186

(51) Int. Cl.⁷ ................................................ H04L 9/00
(52) U.S. Cl. ....................... 713/200; 455/379; 455/410; 455/411; 455/588
(58) Field of Search ................................ 713/200, 201, 713/202

(56) References Cited

U.S. PATENT DOCUMENTS

| 4,827,113 | A | * | 5/1989 | Rikuna ........................ 235/432 |
| 4,903,299 | A | * | 2/1990 | Lee et al. ..................... 380/25 |
| 5,479,612 | A | | 12/1995 | Kenton et al. |
| 5,608,781 | A | * | 3/1997 | Seiderman .................... 379/59 |
| 5,771,287 | A | * | 6/1998 | Gilley et al. ................... 380/4 |
| 5,892,906 | A | * | 4/1999 | Chou et al. ............. 395/188.01 |
| 6,069,410 | A | * | 5/2000 | Antoni et al. .............. 307/10.2 |

FOREIGN PATENT DOCUMENTS

| EP | 0687968 A2 | 12/1995 |
| EP | 0695985 A1 | 2/1996 |
| EP | 0798620 A2 | 10/1997 |
| NZ | 245756 | 12/1995 |
| WO | WO96/25700 | 8/1996 |

OTHER PUBLICATIONS

Grounded Security: American Society for Industrial Security, Jul. 1998. pp. 1–2.*
Laptop Locator: American Society for Industrial Security, Mar. 2001. pp. 1–3.*
Machrone, Bill; Serial Numbers for CPUs: Benefits Outweigh Drawbacks. PC Week, Feb. 8, 1999. 2 pages.*

* cited by examiner

*Primary Examiner*—Gail Hayes
*Assistant Examiner*—Lexnna Ha
(74) *Attorney, Agent, or Firm*—Burns, Doane, Swecker & Mathis, LLP

(57) ABSTRACT

The present invention relates to an electronic anti-theft device for computers and other processor-assisted electronics, such as memory components, hard disks, plug-in boards and processors. The anti-theft device comprises a blocking circuit which is integrated with the component to be protected, said circuit comprising a memory for storing a specific identity code (ID-code) for each blocking circuit. In addition, the circuit comprises an input for inputting a key code into the circuit, and a comparator for comparing the introduced key code with the ID-code of the circuit, the circuit being adapted to block the component from further use in case of an incorrect key code.

26 Claims, 3 Drawing Sheets

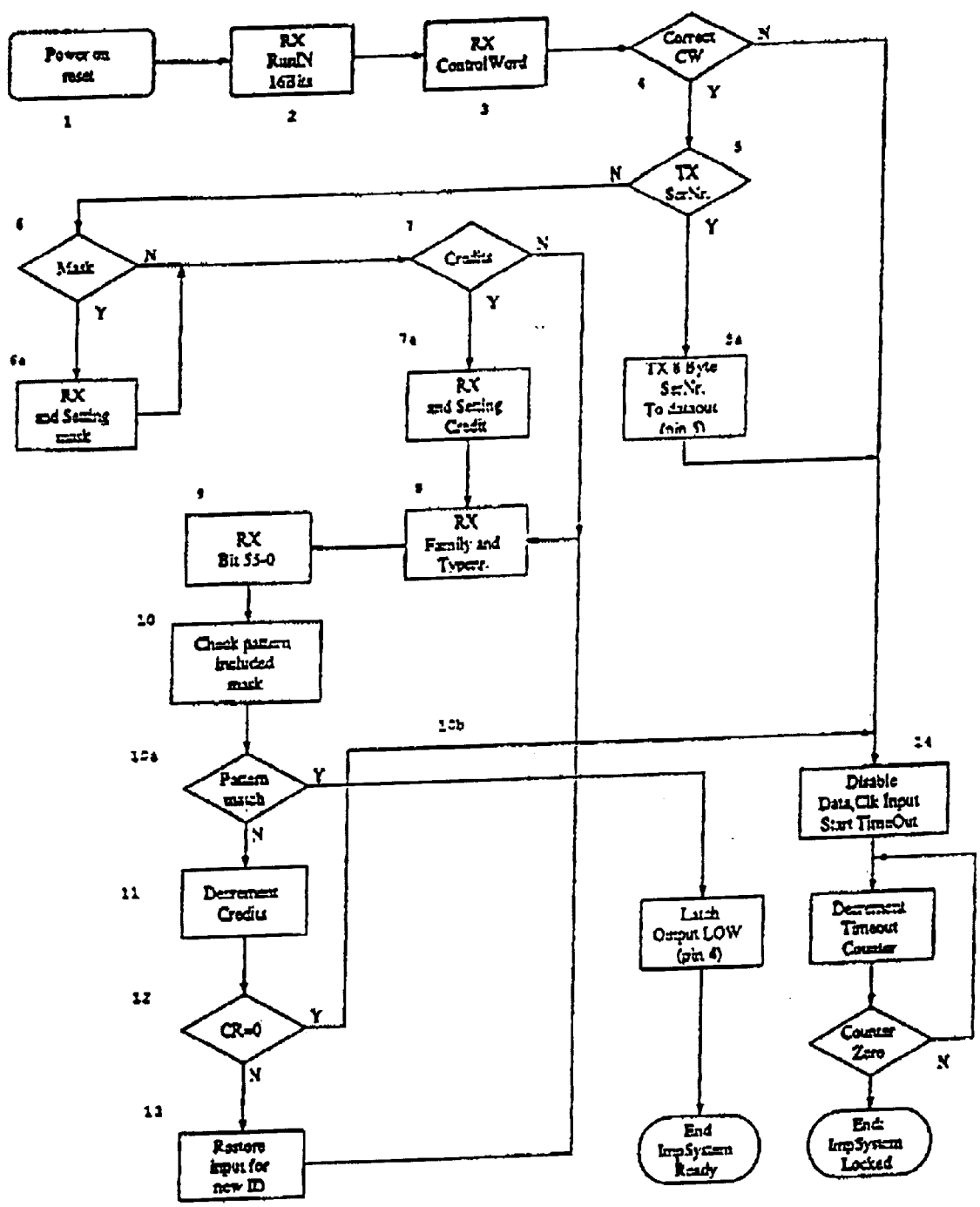

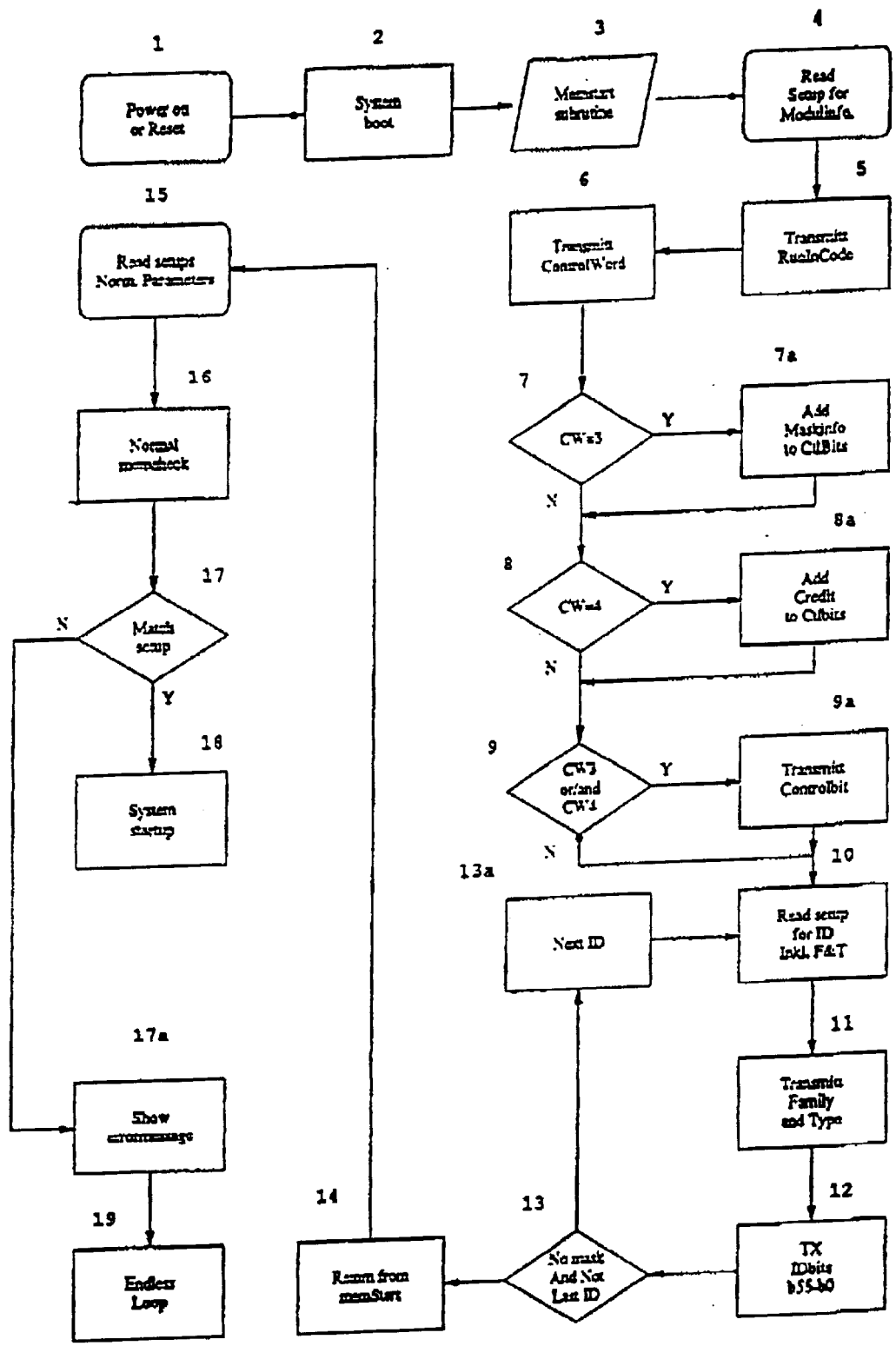

ANTI-THEFT DEVICE

TECHNICAL FIELD

The present invention relates to an anti-theft device for e.g. computers and/or computer components, such as memory modules, plug-in boards, hard disks etc.

BACKGROUND

Within the computer business the number of thefts of particularly the internal components of the computers, such as the memory modules, processors, hard disks etc. has risen considerably lately, which naturally poses serious problems for those affected.

It is already known from EP-A2-687 968 to use a circuit in a computer which in connection with start-ups of the computer automatically displays information on personal ownership. The identity data are stored in a non-volatile memory and the identity is checked at each start-up of the system. However, the circuit does not prevent an unauthorised person from direct use of the computer, nor does it prevent computer components from being stolen.

In order to remedy this problem the inventors provide a system making unauthorised use of stolen computer equipment impossible.

OBJECT OF THE INVENTION

Consequently one object of the present invention is to provide an anti-theft device which makes unauthorised use of stolen computers or computer parts substantially more difficult.

This object is obtained by means of a device as defined in claim 1.

BRIEF DESCRIPTION OF THE DRAWINGS

For exemplifying purposes the invention will be described in the following in more detail with reference to an embodiment and to the accompanying drawings, wherein:

FIG. 4 is a flow chart of the blocking-circuit function, and

FIG. 5 is a flow chart of the start-up process in accordance with one application.

DESCRIPTION OF PREFERRED EMBODIMENTS

Figure 1:
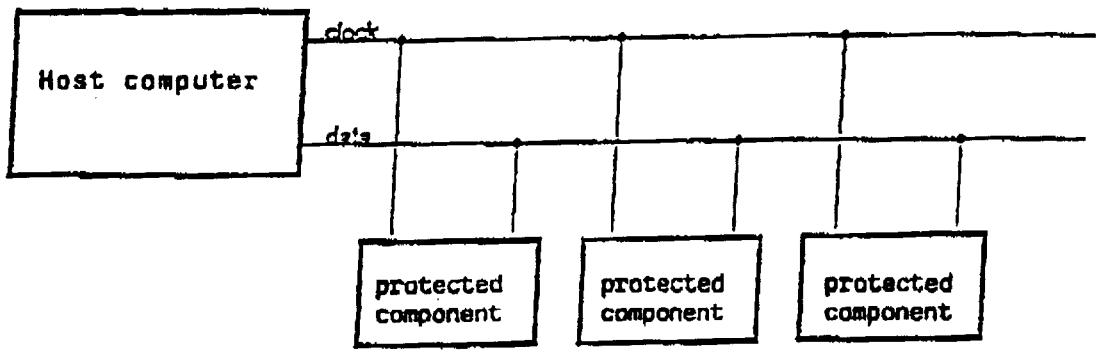
FIG. 1 shows the basic idea of the invention.
Figure 2:
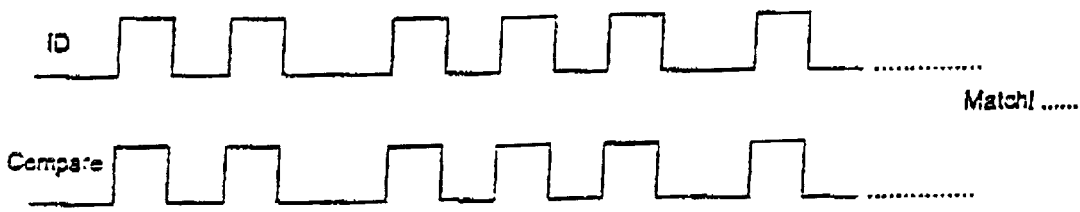
FIG. 2 shows the ID-check generally in accordance with the invention.

As schematically illustrated in FIG. 1 the anti-theft device in accordance with the invention concerns protection of e.g. different components in a computer. The components are checked at computer start-ups. This is effected by providing each protected component with a specially made identifying circuit (blocking circuit) by means of which the data flow to the component is checked. Each blocking-circuit of each component has a specific identity code (ID-code). The code is also entered into the host computer and may be checked automatically at each start-up as illustrated in FIG. 2. Alternatively, the code could instead be stored in the computer hard disk or the like. In the event the computer detects a component having a code that is unacceptable to the computer the system stops. Additionally, the very module which requires the correct code in order to operate is also blocked. This circuit is unique owing to its one-way communication, which means that it is possible to enter direct information into the circuit but not to retrieve ID-information therefrom, which guarantees full security.

If the blocking-circuit has a performance of 64 bits about $18.4 \times 10^{18}$ possible ID-code combinations are obtainable. It may be added that the-ID-code preferably is stored permanently.

Owing to this arrangement uncontrolled transfer of modules (memories, boards etc) between computers becomes impossible. This means that the computer and its modules can function together only provided that the codes of the computer and of the modules match.

Figure 3:
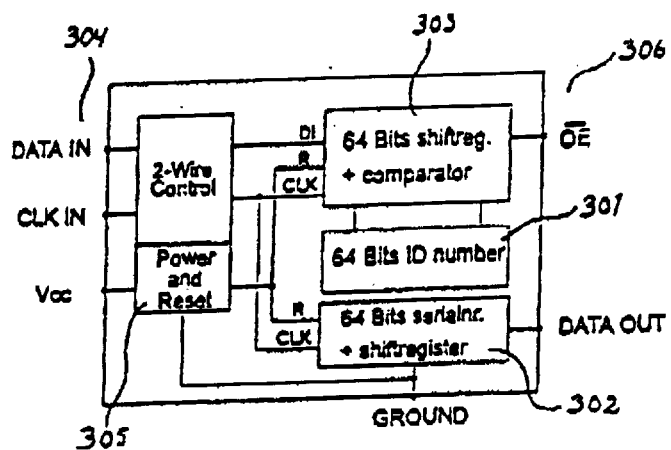
FIG. 3 is a block diagram of the structure of the check circuit.

One embodiment of the blocking-circuit is illustrated in FIG. 3. This circuit comprises two permanent memory units 301, 302, such as EEPROM, one memory 301 being intended for storage of an ID-code and one memory 302 for storage of a serial number. The serial number is accessible from outside the circuit whereas the ID-number is not. In addition, the circuit comprises a supply voltage input 305 and one data input 304 and a comparator for comparing the data entered via the input 304 with the ID-code stored in memory 302. Additionally, the circuit comprises an output 306 by means of which the circuit can block the component on which it is located. This output 306 is connected to the comparator in such a manner that the circuit activates the blocking function when a key code entered via the input 304 does not match the stored ID-code.

Several components fitted with a blocking-circuit could partly have the same ID-codes and thus be called in the same manner. This could be done by so-called masking, according to which only certain of the ID-code elements are compared with the key code. This is advantageous e.g. for business enterprises to whom problem-free exchange of components between the company computers is a desirable feature. The possible number of such groups depends on the number of positions that may be masked.

The function of the blocking-circuit will be described in more detail in the following with reference to the flow chart of FIG. 4.

1. The circuit is initially supplied with voltage, Vcc (of e.g. +5V DC), which activates the reset function.

2. The-start-up code ("RunIN-code") is entered on the blocking-circuit data input 304. Thereafter, the blocking-circuit is ready to receive a control word.

3. A control word is then entered to control the circuit.

4. The blocking circuit checks whether or not the control word is accurate. If not, the blocking circuit is disabled, which blocks the component.

5. A control word may for instance involve transfer of the blocking-circuit serial number to a data output of the circuit.

6. A second control word could instead involve a demand for masking (6a).

7. A third control word provides crediting of the incorrect register (7a).

8. Family and type numbers are then entered into the blocking-circuit data input 304.

9. The remaining bits (55-0) are then entered in the blocking-circuit data input 304.

10. The blocking-circuit compares the bit pattern including the mask in case the control word relating to masking is present. In case of pattern match (10a), the blocking circuit sets the control output to an active level (10b). The blocking circuit is then disabled and the exit remains low until the blocking circuit is restarted.

11. Decrement of error register by one.

12. If error register is set to zero the blocking circuit is disabled.

13. Otherwise, the blocking circuit is restored to a position of reception of fresh key code and returns to point 8.

14. Disabling routine of blocking circuit. Control output remains in previous status (10b).

In the following, a start-up process for a system having components that are protected by blocking circuits will be described with reference to the flow chart of FIG. 5.

1. The system is started or "resetted"

2. System boot is effected.

3. The system goes to blocking-circuit control program.

4. The control program reads set-up system parameters for the blocking-circuit module.

5. The control program transmits RunIN-code which activates the blocking circuit, placing it in reception position.

6. The control program transmits a control word to the blocking circuits which emits instructions to the blocking-circuit regarding how to handle input data.

7. The control program adds masking information (7a), should this be requested in set-up.

8. The control program adds credit value (8a), should this be required in set-up.

9. Any information under point 7 and/or 8 is transferred (9a) to the blocking circuit.

10. The control program reads set-up information for ID-codes.

11. Transmits information to blocking circuit.

12. Transmits ID-code to blocking circuit.

13. The control program checks for arrival of additional key codes. When masking has been demanded the control program disregards this. Otherwise a new ID is read (13a).

14. The control program is completed and returns to the main program.

15. The system reads the parameters in the memory and initiates.

16. The system performs self-test.

17. Self-test OK produces normal start-up (18). If no, show error message (17a).

18. Start-up.

19. System is locked in endless loop.

Because of the above-mentioned error register the blocking-circuit may allow a number of error ID-code input attempts. The number of allowable attempts of this kind depends on the indicated credit value. The error register is decreased by 1 for each input attempt and when it reaches 0 the circuit is blocked against reception of additional input attempts. This function is desirable in cases when the ID-code input operation is done for instance manually and consequently clerical errors and the like may occur. In addition, the function is desirable when several components are arranged in sequence and transmitted data must reach all components. In this cases all ID-codes may be transmitted to all components and each component will regard the ID-codes of the other components as erroneous attempts.

The blocking-circuit in accordance with the invention makes uncontrolled exchanges of modules (memories, boards, processors etc.) impossible between computers or groups of computers, since a computer and its modules can function together only on condition that the computer and the module codes match. This efficiently obstructs the fencing business, which in turn reduces the attractiveness of the articles that are especially liable to be stolen.

It is likewise possible to provide for a data register of the serial numbers, ID-codes, and ownership of different blocking circuits. It is also possible to add other information to a register of this nature. However, this register should be protected to ensure that only the police authorities and other authorised persons or institutions have access thereto. The register may be used passively in order to simplify the investigations in case of theft or the like or to allow the lawful owner to retrieve lost codes. It could also be used actively to provide component manufacturers, retailers and the like access to the correct ID-code based on a specific serial number when the circuit is to be initiated.

The blocking-circuit in accordance with the invention is integrated in the circuit layout of each module and blocks it owing to its configuration until the correct key is used. The code in the blocking-circuit is not in any way accessible from the outside otherwise than through identification via the register that is connected to the blocking circuit. In addition, the blocking-circuit is sufficiently small to allow it to be bonded to any electronic module, Preferably, the blocking-circuit is also encapsulated, making it completely inaccessible to influences from the outside.

In the manufacture of computer components or electronic components which are provided with blocking circuits in accordance with the intention it is possible to store the ID-code in the circuit memory already during the manufacturing. However, this requires that the components are accompanied by a list of the ID-codes applicable to each component, allowing the codes to be entered into the control program when the system is assembled.

An alternative method is to provide the anti-theft device with a so-called time-out function. A delay function of this kind could mean for instance that the locking circuit is not activated, with the result that the component is kept accessible for a predetermined time period which typically amounts to a few minutes. During this time period the component and the blocking-circuit is serviceable to the user and consequently, when the system is assembled, the user himself may enter the ID-codes desired for the components. However, these ID-codes could still be decided upon centrally by the component manufacturer and delivered to the user when the system is completed.

The invention has been described above with reference to one embodiment. However, several varieties of the invention are possible, For instance the anti-theft device in accordance with the invention may be used in other contexts than in computers, such as in mobile telephones, electronic boxes in cars and boats and the like wherein control is carried out with the aid of processors of some kind. Naturally it is likewise possible to use key codes having a different division between the ID part, the control word and so on, just as it is also possible to use key codes of different length. Further, it is also possible to activate the blocking-circuit and transfer key codes in a different manner, for instance via radio signals or other wireless signals. In this manner it could be possible to trigger the blocking function by remote control in stolen property such as vehicles, mobile telephones and similar appliances.

Such modifications of the embodiment must be considered obvious and to be encompassed by the invention as the latter is defined in the appended claims.

What is claimed is:

1. Electronic anti-theft system for computers and processor-assisted electronics, characterized in that it comprises:
   a component to be protected; and
   a blocking circuit integrated with the component to be protected, the blocking circuit comprising:
      a first memory area for storing a specific identity-code (ID-code) unique to the blocking circuit;
      a second memory area for storing a serial number unique to the component; and
      a time-delaying unit for delaying, during a pre-set time-period, a blocking of the component,
   wherein the blocking circuit is adapted to block the component from further use in case of a non-correct key-code.

2. Electronic anti-theft system for computers and processor-assisted electronics, characterized in that it comprises:
   a component to be protected; and
   a blocking circuit integrated with the component to be protected, the blocking circuit comprising:
      a first memory for storing a specific identity-code (ID-code) unique to the blocking circuit; and
      a time-delaying unit for delaying, during a pre-set time-period, a blocking of the component,
   wherein the blocking circuit is adapted to block the component from further use in case of a non-correct key-code.

3. Electronic anti-theft system as claimed in claim 1, characterized in that the system further comprises a third memory area having a register of ID-codes for one or more different components, including said component, equipped with anti-theft devices, wherein the system during start-up automatically sends out key-codes to these components for control thereof, and whereby the system will function after start-up only when the codes of the system and of the components match.

4. Electronic anti-theft system as claimed in claim 1, characterized in that the ID-code not is available from the circuit.

5. Electronic anti-theft system as claimed in claim 1, characterized in that the ID-code is stored permanently in the first memory area.

6. Electronic anti-theft system as claimed in claim 2, characterized in that the system further comprises a second memory having a register of ID-codes for one or more different components, including said component, equipped with anti-theft devices, wherein the system during start-up automatically sends out key-codes to these components for control thereof, and whereby the system will function after start-up only when the codes of the system and of the components match.

7. Electronic anti-theft system as claimed in claim 2, characterized in that the ID-code not is available from the circuit.

8. Electronic anti-theft system as claimed in claim 3, characterized in that the ID-code not is available from the circuit.

9. Electronic anti-theft system as claimed in claim 6, characterized in that the ID-code not is available from the circuit.

10. Electronic anti-theft system as claimed in claim 2, characterized in that the ID-code is stored permanently in the first memory.

11. Electronic anti-theft system as claimed in claim 3, characterized in that the ID-code is stored permanently in the first memory area.

12. Electronic anti-theft system as claimed in claim 4, characterized in that the ID-code is stored permanently in the first memory area.

13. Electronic anti-theft system as claimed in claim 6, characterized in that the ID-code is stored permanently in the first memory.

14. Electronic anti-theft system as claimed in claim 7, characterized in that the ID-code is stored permanently in the first memory.

15. Electronic anti-theft system as claimed in claim 8, characterized in that the ID-code is stored permanently in the first memory area.

16. Electronic anti-theft system as claimed in claim 9, characterized in that the ID-code is stored permanently in the first memory.

17. Electronic anti-theft system as claimed in claim 1, characterized in that the serial-number is available from outside the blocking circuit so that a data register can be built up containing a plurality of serial-numbers correlated with corresponding ID-codes for one or more components comprising the anti-theft system, and which possibly even correlate the serial-numbers and corresponding ID-codes with information about the owners of one or more components.

18. Electronic anti-theft system as claimed in claim 2, characterized in that the blocking circuit also comprises a unique serial-number stored in a second memory, and the serial-number is available from outside the blocking circuit so that a data register can be built up containing a plurality of serial-numbers correlated with corresponding ID-codes for one or more components comprising the anti-theft system, and which possibly even correlate the serial-numbers and corresponding ID-codes with information about the owners of one or more components.

19. Electronic anti-theft system as claimed in claim 3, characterized in that the serial-number is available from outside the blocking circuit so that a data register can be built up containing a plurality of serial-numbers correlated with corresponding ID-codes for one or more components comprising the anti-theft system, and which possibly even correlate the serial-numbers and corresponding ID-codes with information about the owners of one or more components.

20. Electronic anti-theft system as claimed in claim 4, characterized in that the serial-number is available from outside the blocking circuit so that a data register can be built up containing a plurality of serial-numbers correlated with corresponding ID-codes for one or more components comprising the anti-theft system, and which possibly even correlate the serial-numbers and corresponding ID-codes with information about the owners of one or more components.

21. An anti-theft blocking circuit, comprising:
   a first memory area for storing a specific identity-code (ID-code) unique to the blocking circuit; and
   a second memory area for storing a serial number unique to a component, the component being a device to which the blocking circuit is integrated,
   wherein some bits of the ID-code are masked so that the blocking circuit will not block the operation of the component if only a portion of a key-code received by the blocking circuit matches only a portion of the ID-code.

22. The anti-theft blocking circuit as claimed in claim 21, wherein the serial number is accessible from the blocking circuit and the ID-code is not accessible from the blocking circuit.

23. The anti-theft blocking circuit as claimed in claim 21, further comprising:
 a comparator coupled to said first memory area; and
 a communication terminal coupled to said comparator for input of a key-code, wherein the comparator compares the key-code with the ID-code so as to block operation of the component in the case when the key-code does not match the ID-code.

24. An anti-theft blocking circuit, comprising:
 a first memory area for storing a specific identity-code (ID-code) unique to the blocking circuit;
 a second memory area for storing a serial number unique to a component, the component being a device to which the blocking circuit is integrated; and
 a time-delaying unit for delaying, during a pre-set time-period, a blocking of the component from further use in the case of a non-correct key-code.

25. Electronic anti-theft system as claimed in claim 2, characterized in that the blocking circuit further comprises:
 a communication terminal for input of a key-code into the blocking circuit; and
 a comparator for comparing the key-code with the ID-code.

26. The anti-theft blocking circuit as claimed in claim 24, characterized in that the blocking circuit further comprises:
 a communication terminal for input of a key-code into the blocking circuit; and
 a comparator for comparing the key-code with the ID-code.

* * * * *